(12) United States Patent
Cho

(10) Patent No.: US 6,307,530 B1
(45) Date of Patent: Oct. 23, 2001

(54) LCD MONITOR HAVING PARTITIONED CIRCUIT SECTION

(75) Inventor: Chang-Ho Cho, Incheon-si (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/102,094

(22) Filed: Jun. 22, 1998

(30) Foreign Application Priority Data

Jul. 1, 1997 (KR) .................................................. 97-17381

(51) Int. Cl.[7] ....................................................... G09G 3/36
(52) U.S. Cl. ............................. 345/87; 345/905; 348/794
(58) Field of Search ..................... 345/87, 905; 361/681, 361/688; 349/50; 348/886, 794

(56) References Cited

U.S. PATENT DOCUMENTS 5,583,529 * 12/1996 Satou ....................................... 345/87
6,020,867 * 2/2000 Shimada et al. ...................... 345/87

* cited by examiner

*Primary Examiner*—Richard Hjerpe
*Assistant Examiner*—Alexander Eisen
(74) *Attorney, Agent, or Firm*—Robert E. Bushnell, Esq.

(57) ABSTRACT

An LCD monitor having a partitioned circuit section is adapted to prevent a failure or malfunction caused by heat generated by the circuit section, and includes: an interface board receptive to video and sync signals generated by a computer; a main printed circuit board (PCB) for processing the video and sync signals received from the interface board, and for displaying the video signals on a liquid crystal panel; a power PCB for rectifying an AC into DC to supply a DC drive voltage to the main PCB and an audio PCB, the power PCB being disposed apart from the main PCB by a specified distance to prevent heat generated in the DC supply from causing a failure or malfunction of components in the main PCB; and an invertor PCB for converting the DC supplied by the power PCB to alternating current (AC), the power PCB separated from the main PCB being disposed on the side of an invertor section in the liquid crystal panel.

14 Claims, 4 Drawing Sheets

LCD MONITOR HAVING PARTITIONED CIRCUIT SECTION

CLAIM OF PRIORITY

This application makes reference to, incorporates the same herein, and claims all benefits accruing under 35 U.S.C. § 119 from my application entitled Lcd Monitor Having Partitioned Circuit Section filed in the Korean Industrial Property Office on Jul. 1, 1997 and there duly assigned Ser. No. U97-17381 by that Office.

BACKGROUND OF THE INVENTION

1. Technical Field

The present invention generally relates to an LCD (liquid crystal display) monitor having a liquid crystal panel on which a picture is displayed according to video signals externally applied. More particularly, the present invention relates to an LCD monitor improved to prevent a failure or malfunction caused by the heat generated from a circuit section employed therein.

2. Related Art

In general, an LCD monitor includes a liquid crystal panel on which a picture is displayed and has such a construction that the liquid crystal panel is mounted in a space defined by the front and rear cases of the monitor. The liquid crystal panel is structured in the form of a panel thinner than the cathode ray tube, and thus the whole width (thickness) of the display section (composed of front and rear cases) is relatively thin in the LCD monitor.

The space given in the display section for mounting a circuit section is so small that it is inadequate to discharge heat generated from the circuit section.

Thus, the LCD monitor employs a heat exhaust device to effectively discharge the heat generated from the circuit section, or any structure for the same purpose.

An LCD monitor, and especially a compact LCD monitor, has a structure that cannot have a heat exhaust device. For that reason, the heat exhaust structure has numerous heat exhaust holes in the case.

However, such heat exhaust holes are unsatisfactory to discharge the heat effectively in an LCD monitor that has a small space for the circuit section because the circuit board is mounted in a very small space, and the board forming the circuit section is disposed in close vicinity to the case or the liquid crystal panel.

When a large space for the circuit section is provided in the display monitor, another problem arises in that the thickness of the display section becomes larger.

A compulsory ventilation arrangement may be used to solve the problem in exhausting the heat out of such a small space for the circuit section, but that involves the use of a motor that increases the unit cost and causes noise.

SUMMARY OF THE INVENTION

An object of the present invention is to provide an LCD monitor having a partitioned circuit section wherein the circuitry generating heat is separated from the other circuitry and is adequately disposed in harmony with a liquid crystal panel and an audio board.

To achieve these and other advantages and in accordance with the purpose of the present invention, as embodied and broadly described, an LCD monitor having a partitioned circuit section includes: an interface board receptive to video and sync signals generated by a computer; a main printed circuit board (PCB) for processing the video and sync signals received from the interface board, and for displaying the video signals on a liquid crystal panel; a power PCB for rectifying an alternating current (AC) into a direct current (DC) to supply a DC drive voltage to the main PCB and the audio PCB, the power PCB being disposed separate from the main PCB at a specified distance to prevent heat generated in the DC supply from causing a failure or malfunction of components in the main PCB; and an invertor PCB for converting the DC supplied by the power PCB to AC.

In another aspect of the present invention, the power PCB separated from the main PCB is disposed on the side of an invertor section in the liquid crystal panel.

In still another aspect of the present invention, the power PCB is mounted so as to be different in height from the main PCB, and the main PCB is disposed in the vicinity of a rear case having a heat exhaust hole for the prevention of overheating.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
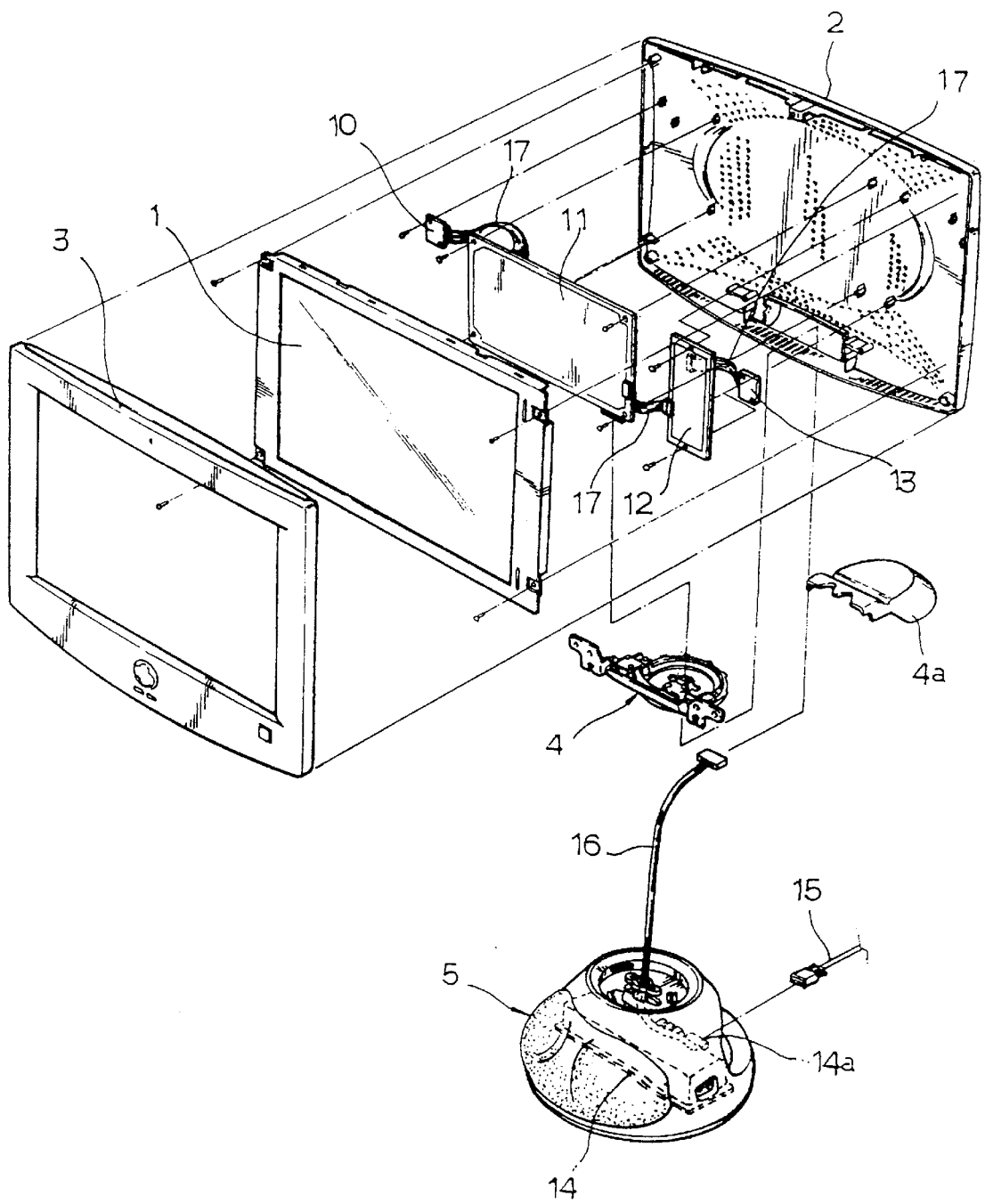
FIG. 1 is an exploded perspective of an LCD monitor in accordance with the present invention.

An exploded view of an LCD monitor according to the present invention is given in FIG. 1.

As shown in the figure, a liquid crystal panel 1 on which a picture is displayed is fixed to a rear case 2 that has a plurality of boards constituting a circuit section, and a front case 3 in front of the liquid crystal panel 1 is coupled to the rear case 2.

In the lower part of the rear case 2 is disposed a hinge portion 4 with a hinge case 4a, and a stand portion 5 having another circuit section formed therein is disposed in the lower part of the hinge portion 4.

The circuit section in the rear case 2 is composed of: an interface board 10 receptive to video and sync signals generated by a computer; a main PCB 11 for processing the video and sync signals received from the interface board 10 so as to display the video signals on the liquid crystal panel 1; a power PCB 12 for rectifying an AC into a DC to supply a DC drive voltage to the main PCB 11, the power PCB 12 being separated from the main PCB 11 by a specified distance to prevent the heat generated in the DC supply from causing a failure or malfunction of the component in the main PCB 11; and an invertor PCB 13 for converting the DC supplied by the power PCB 12 to AC.

Further, in the stand portion 5 there is disposed an audio PCB 14 which forms another circuit section for boosting an audio signal generated by the computer. The audio PCB 14 has a jack 14a connected to an external cable 15.

In further detail, the LCD monitor has the liquid crystal panel 1, on both sides of which front case 3 and rear case 2 are fixed in close vicinity to each other.

Such a configuration provides a very confined space for the circuit section that limits the exhaust of heat generated by the circuit section.

Therefore, the present invention provides a partitioned circuit section because the heat, if not eliminated effectively, may cause malfunction of components in the circuit section, as mentioned previously.

Figure 2:
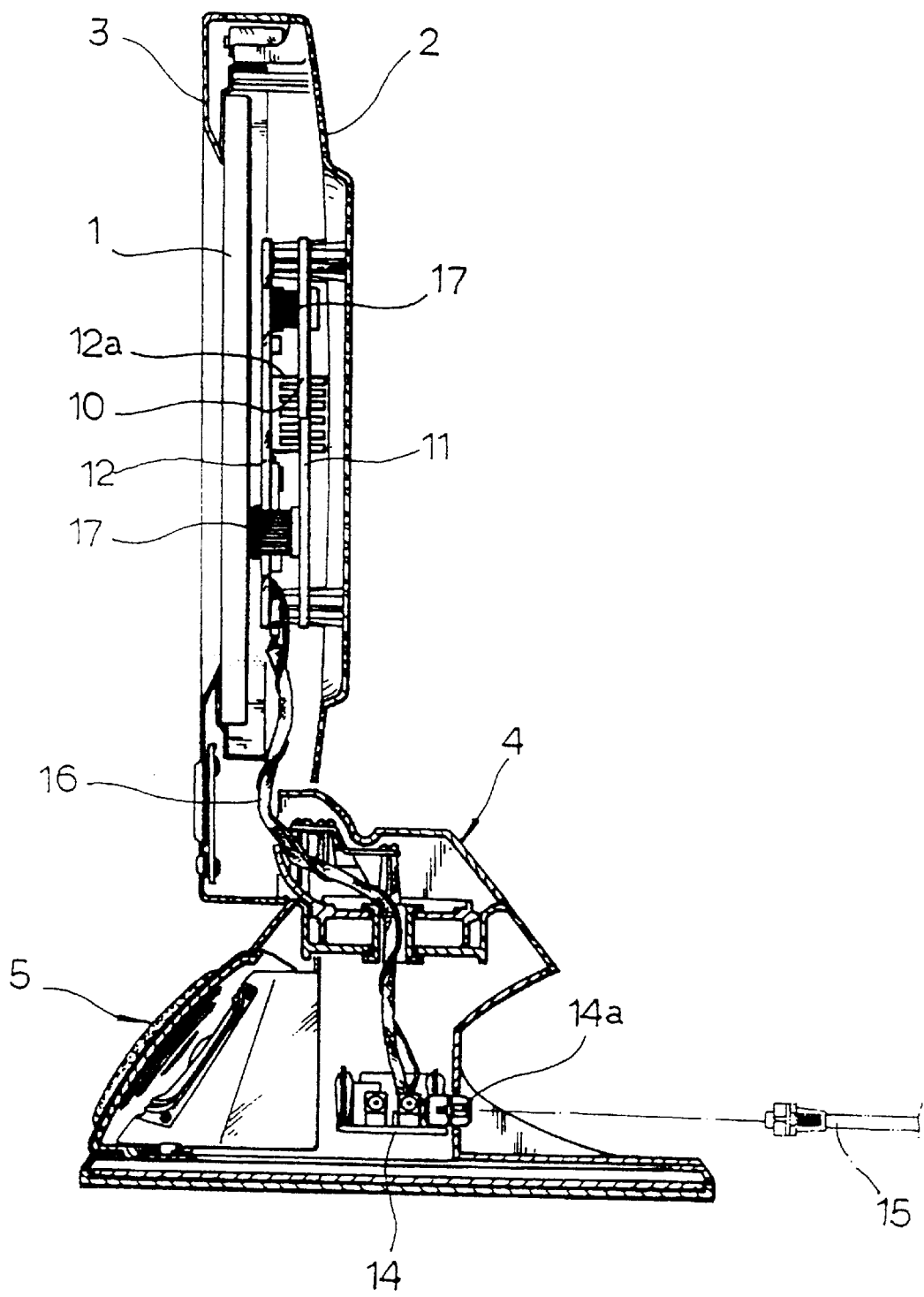
FIG. 2 is a cross-sectional view of the LCD monitor in accordance with the present invention.
Figure 4:
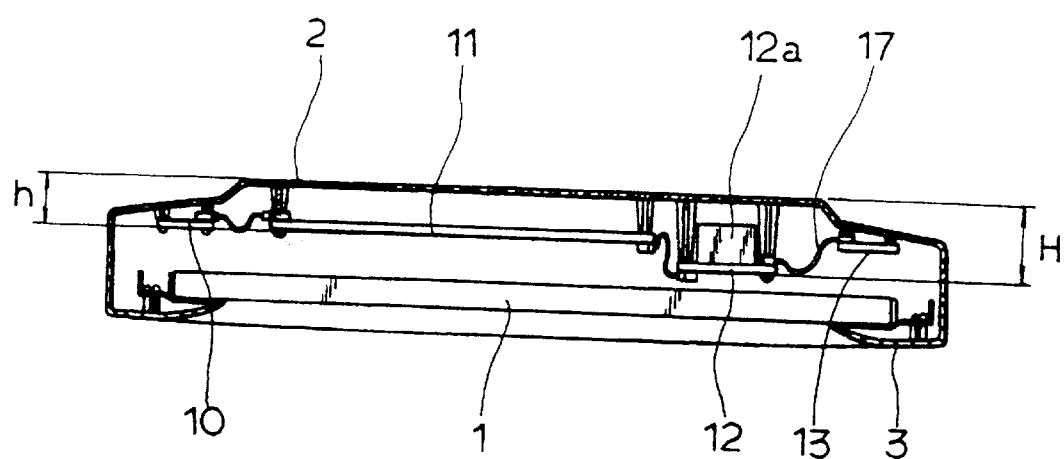
FIG. 4 is an enlarged cross-section taken along the line A–A' in FIG. 3.

Particularly, the power PCB 12 which emits a lot of heat has a heat sink 12a (FIG. 2) for the exhaust of the heat, and accordingly is fixed to the rear case 2. As illustrated in FIG. 4, the power PCB 12 must be disposed so as to have a necessary height H in order to provide a space for the heat sink 12a.

The other boards (i.e., main PCB 11, interface board 10 and invertor PCB 13), which have no heat sink, are separated from the power PCB 12 so that they are protected against excessive heat transmitted by the power PCB 12. They also have a height "h" almost as low as that of a heat exhaust hole 12a in the rear case (or back cover) 2.

The main PCB 11, interface board 10 and invertor PCB 13 are disposed apart from the power PCB 12 for the prevention of the heat generated by the power PCB 12 and are in the vicinity of the heat exhaust hole 12a, thereby preventing overheating after a long period of use.

The present invention is also characterized by a power PCB 12, which is disposed apart from the main PCB 11, and which is separately positioned on the side of an invertor portion of the liquid crystal panel 1 so that the power PCB 12 is located near the switch.

Figure 3:
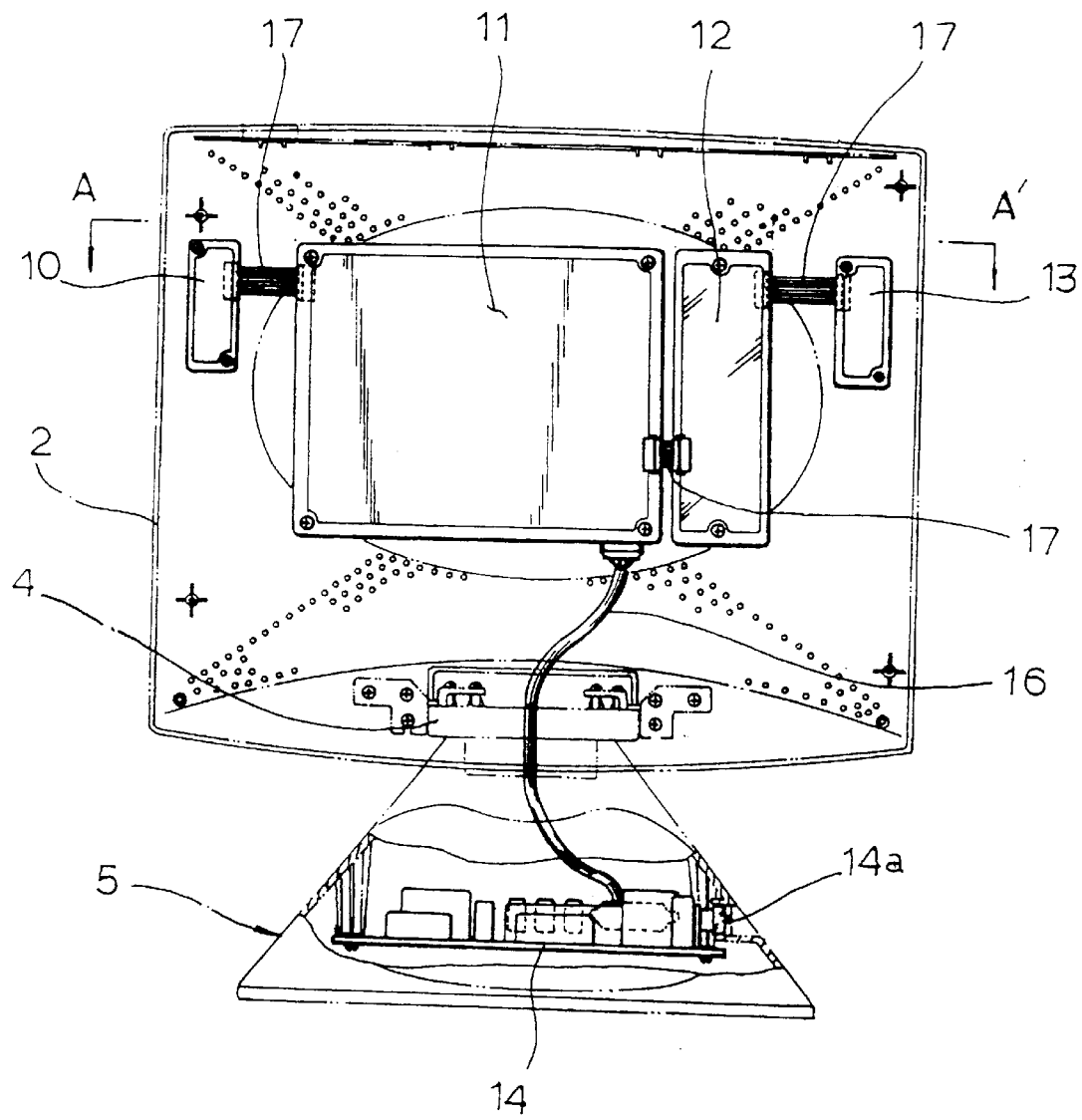
FIG. 3 is a front view of the configuration of a circuit section and illustrates the present invention.

For better installation and separation of the circuit section, as illustrated in FIG. 3, a main cable 16 connects the audio PCB 14 to the main PCB 11, and connect cables 17 connect main PCB 11 to power PCB 12, power PCB 12 to invertor PCB 13, and interface board 10 to main PCB 11.

As described above, the present invention has a partitioned circuit section that contains main and power PCBs so as to interrupt the transfer of heat generated by the circuit section, and accordingly, the circuit section hardly causes a malfunction, even in a small space.

Further, the present invention makes it possible to dispose the boards, such as the main PCB, separated from the power PCB which generates a lot of heat, and in the vicinity of the heat exhaust hole for the prevention of overheating.

Accordingly, the present invention has an advantage in that the life of the LCD monitor can be prolonged with enhancement of the reliability of the product.

It will be apparent to those skilled in the art that various modifications and variations can be made in the LCD monitor having a partitioned circuit section of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) monitor operating with a computer and having a liquid crystal panel and a partitioned circuit section, comprising:

main printed circuit board (PCB) means for processing video and sync signals generated by the computer, and for displaying the video signals on said liquid crystal panel, said main PCB means defining a plane parallel to said liquid crystal panel;

interface board means disposed in the plane defined by said main PCB means and disposed on a first side of said main PCB means, said interface board means being connected to said main PCB means for providing the video and sync signals generated by said computer to said main PCB means; and power PCB means disposed on a second side of said main PCB means, opposite to said first side, and connected to said main PCB means for rectifying an alternating current (AC) into a direct current (DC) to supply a DC drive voltage to said main PCB means;

said LCD monitor further comprising invertor PCB means disposed in the plane defined by said main PCB means and on a side of said power PCB means remote from said main PCB means, said invertor PCB means being connected to said power PCB means for converting the DC supplied by said power PCB means into AC.

2. The LCD monitor as defined in claim 1, wherein the liquid crystal panel includes an invertor section, and wherein said power PCB means is disposed on a side of said invertor section.

3. The LCD monitor as defined claim 1, wherein said power PCB means is mounted at a level different from a level of said main PCB means.

4. The LCD monitor as defined in claim 3, further comprising a rear case having a heat exhaust hole to prevent overheating, and wherein said main PCB means is disposed proximate to said rear case.

5. The LCD monitor as defined in claim 1, further comprising a rear case having a heat exhaust hole to prevent overheating, and wherein said main PCB means is disposed proximate to said rear case.

6. The LCD monitor as defined in claim 1, wherein said power PBC means is disposed separate from said main PCB means by a specified distance so as to prevent heat generated in the monitor from causing a malfunction of said main PCB means.

7. The LCD monitor as defined in claim 1, wherein said main PCB means comprises a flat PCB parallel to the liquid crystal panel and defining the plane parallel to the liquid crystal panel.

8. A liquid crystal display (LCD) monitor operating with a computer and having a liquid crystal panel, comprising:

main printed circuit board (PCB) means for processing video and sync signals generated by said computer, and for displaying the video signals on said liquid crystal panel;

receiving means disposed on a first side of said main PCB means for receiving the video and sync signals, and connected to said main PCB means for providing the video and sync signals thereto; and power PCB means disposed on a second side opposite to said first side of said main PCB means and connected to said main PCB means for supplying a direct current (DC) drive voltage to the main PCB means;

wherein the power PCB means is mounted adjacent to, and at a level different from a level of, said main PCB means; and wherein said main PCB means defines a plane parallel to the liquid crystal panel, and said power PCB means is disposed in a plane parallel to, but separate from, the plane defined by said main PCB means.

9. The LCD monitor as defined in claim 8, further comprising a rear case having a heat exhaust hole to prevent overheating, and wherein said main PCB means is disposed proximate to said rear case.

10. The LCD monitor as defined in claim 8, further comprising invertor PCB means connected to said power PCB means for converting direct current (DC) from said power PCB means into alternating current (AC), and wherein said power PCB means is disposed between said main PCB means and said invertor PCB means.

11. The LCD monitor as defined in claim 8, wherein said power PCB means is spaced apart from said main PCB means to prevent heat generated in said monitor from causing a malfunction of said main PCB means.

12. The LCD monitor as defined in claim 8, wherein said receiving means is disposed in the plane defined by said main PCB means.

13. The LCD monitor as defined in claim 12, wherein said main PCB means comprises a flat PCB located in the plane defined by said main PCB means.

14. The LCD monitor as defined in claim 8, further comprising invertor board means connected to said power PCB means for converting DC supplied by said power PCB means into alternating current (AC), said invertor board means being disposed in the plane defined by said main PCB means.

* * * * *